Feb. 10, 1959  M. R. THORBURN  2,872,841
OPTICAL PROJECTION APPARATUS
Filed July 20, 1956  2 Sheets-Sheet 1
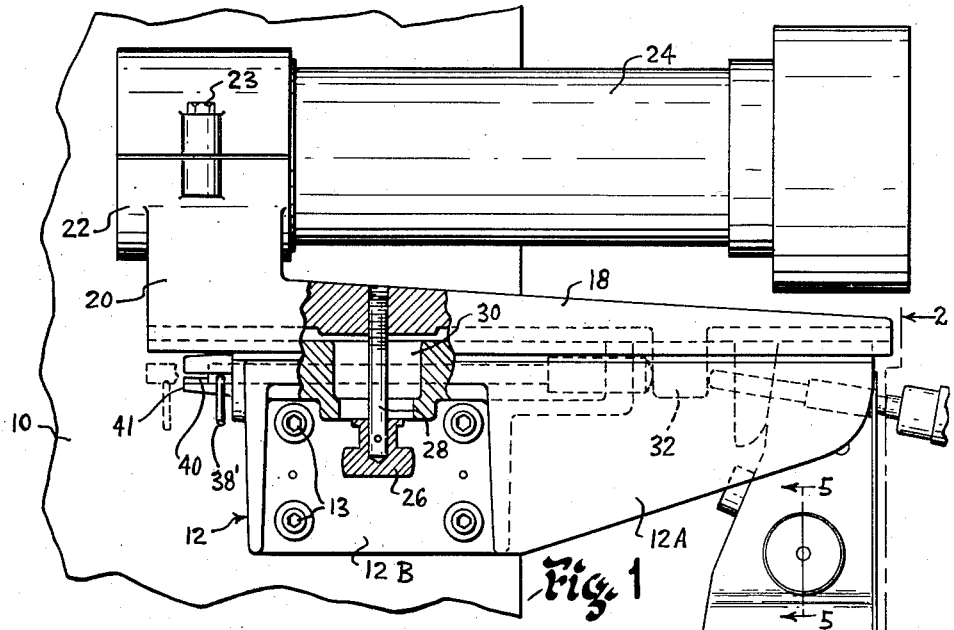
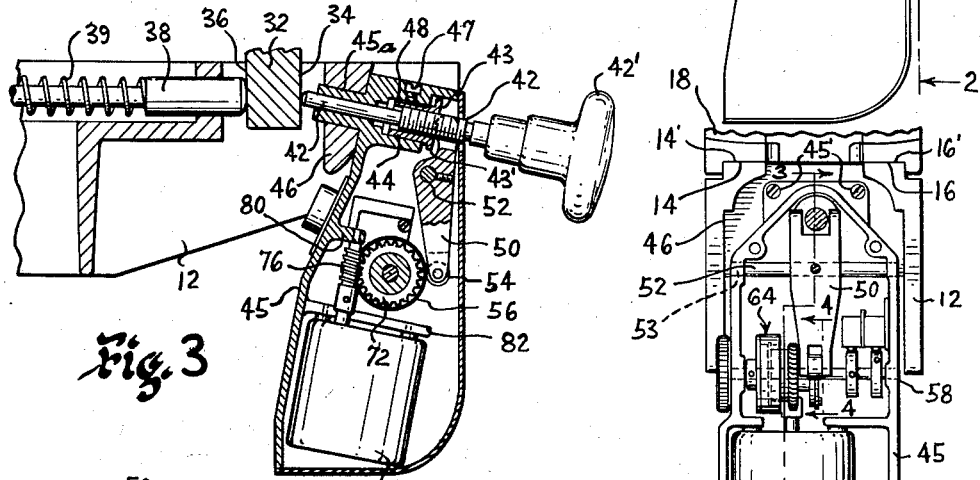
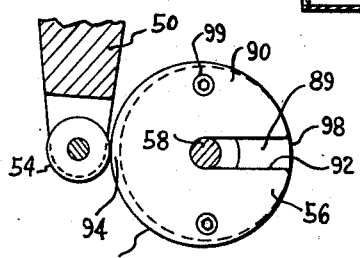
INVENTOR
MILTON R. THORBURN
BY
ATTORNEYS Feb. 10, 1959  M. R. THORBURN  2,872,841
OPTICAL PROJECTION APPARATUS
Filed July 20, 1956  2 Sheets-Sheet 2
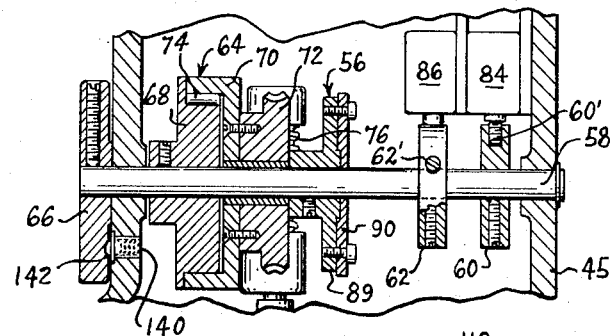
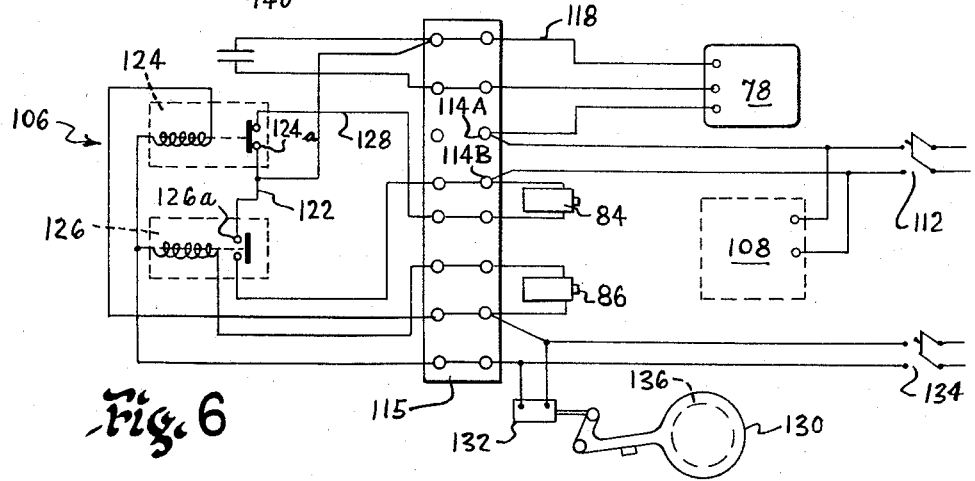
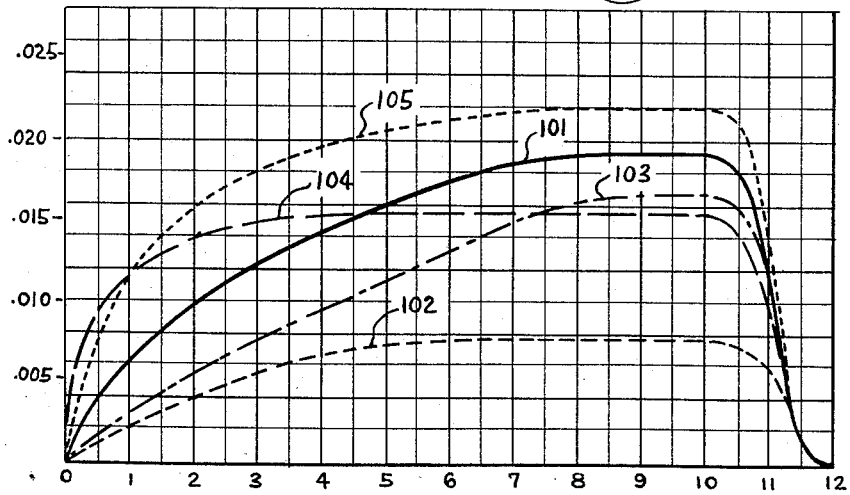
INVENTOR
MILTON R. THORBURN
BY Louis L. Gagnon
Noble D. Williams
ATTORNEYS United States Patent Office 2,872,841
Patented Feb. 10, 1959

2,872,841

OPTICAL PROJECTION APPARATUS

Milton R. Thorburn, Southbridge, Mass., assignor to American Optical Company, Southbridge, Mass., a voluntary association of Massachusetts Application July 20, 1956, Serial No. 599,110

8 Claims. (Cl. 88—16)

This invention relates to optical projection apparatus, such as motion and still picture projectors and the like. More particularly, the invention relates to focusing mechanisms or devices for such projectors for actuating objectives thereof, said mechanisms or devices comprising manually operable means for moving the objectives into proper adjustment so as to obtain sharp focus of the images being projected thereby onto the associated viewing screens as well as additional means for automatically maintaining said objectives in proper focus at all times thereafter during operation of the projectors; whether such be continuous or discontinuous operation thereof.

During the use of projection apparatus, particularly present-day commercial motion-picture projection apparatus wherein high image magnifications and high intensity light sources are being employed, it is usually necessary to not only initially adjust the objective into proper focus but also necessary to have to readjust same a number of times in order to maintain the picture image being projected in proper focus upon the associated viewing screen. Not only is the focus in such a present-day projector more critical due to the fact that greatly increased image magnification ratios are now being used, but also since more powerful light sources are likewise being used, accompanied by greater amounts of heat as well tending to expand or alter the physical and/or optical characteristics of parts of the projector and its objective, the problem of manually maintaining a proper and critical focus of the projected image upon the viewing screen at all times during use of the apparatus has become more difficult than heretofore. The improved device of the present invention, however, provides in apparatus of the character described, an adjustment mechanism which not only may be easily manually actuated to obtain a "best focus" of image for the objective of the projector but which mechanism is also so constructed and arranged that it will continuously and automatically maintain such focus as long as the projector is in operation. Furthermore, the operation of the device is such that this "best focus" when once provided, will be constantly maintained even though the use of the projector may be interrupted and even if in the meantime allowed to cool down to ordinary room temperatures between different periods of operation thereof. Even though the optical and physical properties and characteristics of different projectors and their objectives may differ appreciably, nevertheless, it is possible by following the teachings of the present invention to construct and arrange the improved device of the present invention so that it may be readily adapted to work with any combination thereof and automatically compensate for the particular amounts and rates of change of focus which occur in the projector with which the device is being used so that proper focus of the projector will be automatically and continuously maintained.

While it may be difficult in any particular projector to determine exactly what part or parts of the projector or its objective or both may be causing changes in focus, which for convenience will be hereinafter referred to as "drift," away from the selected "best focus" of the objective, as the projector warms up from normal room temperatures to its ordinary operating temperatures (a period which generally required from three to eight or ten minutes), nevertheless, it is possible insofar as each separate projector is concerned to accurately determine the amounts and rates of change of focus and when such is known to readily and accurately construct and arrange the improved device to compensate therefor. Thus, a condition of "best focus" may be easily manually obtained and thereafter continuously and automatically maintained by each projector upon which such an improved device of the present invention is employed.

It is, accordingly, an object of the present invention to provide in combination with substantially any conventional still or motion-picture projector, or the like, an inexpensive, compact, and efficient focusing mechanism which may be readily adapted for use therewith and which is so constructed and arranged as to enable the objective of the projector to be accurately manually adjusted to affect an initial sharp or "best focus" for the projector in accordance with the particular theater projection conditions being satisfied and, additionally, to provide therewith efficient and inexpensive means for automatically maintaing such "best focus" during subsequent use thereof whether same be continuous or discontinuous.

It is an additional object of the present invention to provide in a focusing mechanism of the character described means whereby said "best focus" will be continuously maintained at all times during use of the device even though the device may be at times out of operation for an extended period or periods in between periods of operation thereof.

It is another object of the invention to provide a focusing mechanism of the character described which may be easily and readily adapted for use with substantially any conventional projector and its objective, and as readily changed when desired for use with another projector and its objective having appreciably different operating and focusing characteristics.

Other objects and advantages of the present invention will become apparent from the detailed description which follows when taken in conjunction with the accompanying drawings in which:

Fig. 1 is a side elevational view of a portion of a projector having an objective mounted thereon and showing the improved focusing mechanism or device of the present invention operatively attached thereto;

Fig. 2 is a sectional view of the focusing mechanism of Fig. 1, taken substantially upon lines 2—2 thereof and looking in the direction of the arrows, the front cover portion of the device having been removed therefrom;

Fig. 3 is a sectional view taken substantially along section lines 3—3 of Fig. 2 and looking in the direction of the arrows, and showing the cover portion replaced thereon;

Fig. 4 is an enlarged fragmentary sectional view taken substantially upon section line 4—4 of Fig. 2 and looking in the direction of the arrows;

Fig. 5 is a sectional view taken substantially on section line 5—5 of Fig. 1 and looking in the direction of the arrows;

Fig. 6 is a wiring diagram showing electrical means which may be used with the focusing mechanism of Fig. 1; and Fig. 7 is a graph for use in obtaining a clear understanding of the present invention.

Referring to the drawings in detail and particularly to Figs. 1, 2 and 3, it will be seen that a projector having a housing 10 has mounted on a forward side wall portion thereof a main elongated supporting bracket 12 which has a front part 12A extending forwardly somewhat from a rear attachment part 12B arranged for bolt connections 13 with the projector housing. Upon the upper surface of this bracket is formed a pair of spaced elongated right-angular guide rails 14 and 16 for slidably receiving and supporting complementary elongated guide surfaces 14' and 16' on an objective supporting shoe 18. The supporting shoe 18, in turn, has integrally formed upon an upper rear arm portion 20 thereof a cylindrically shaped split ring 22 equipped with clamping means 23 so that a projection objective, such as the lens mount 24 in Fig. 1, may be movably and removably secured therein; the particular lens mount, of course, being dependent upon and chosen in accordance with the specific theater and projection conditions which are to be cared for.

In order to allow the supporting shoe 18, and thus the objective carried thereby, to be removably secured upon the main supporting bracket 12, there is provided a manually operable clamping knob 26 which may be pinned or otherwise fixedly secured to a threaded bolt 28 extending upwardly through an elongated slot 30 in the rear part 12B of bracket 12 and intermediate the spaced guide rails 14 and 16, and this bolt has screw-threaded engagement in a part of the supporting shoe 18 between the guide surfaces 14' and 16' thereof. Normally during the use of the projector, the knob 26 would not prevent free sliding movement of the shoe 18 and its objective 24. However, when desired, as during transportation or the like of the projector, the knob 26 can be tightened.

Centrally carried by the supporting shoe 18 at a point forwardly of the clamping means 26—28, is a downwardly extending abutment member 32. This abutment member (see Fig. 3) has vertically arranged front and rear abutment surfaces 34 and 36 thereon so that a spring-pressed plunger 38 slidably carried by flanges of the supporting bracket 12 and pressing against the rear abutment surface 36 will tend to resiliently urge the supporting shoe 18 and the objective 24 forwardly while the opposite abutment surface 34 provides means against which the free end of a focusing screw or shaft 40 normally bears. When it is desired to remove the supporting shoe 18 entirely from the main supporting bracket 12, it is only necessary to unscrew and remove the securing bolt 28 and thereafter retract the plunger means 38 rearwardly against the pressure of the coil spring 39. This may be accomplished by moving a handle portion 38' (see Fig. 1) of the plunger means rearwardly in an elongated slot 40 (in which it is normally seated) until the handle portion 38' is retracted and free from the slot, as indicated by dotted lines, and thereafter rotate the handle sufficiently to cause same to engage a rear edge portion 41 of the bracket 12.

Normally, the spring-pressed plunger 38 will tend to push the abutment member 32 forwardly and into engagement with the focusing shaft 42. This shaft 42 has a manually operable control knob 42' secured upon its forward end and has screw-threaded engagement in a bearing or collar 43 which is, in turn, slidably arranged in a cylindrical bore 44 in a frame-like housing 45. The housing 45 is, as shown at 45' in Fig. 2, detachably secured as by screws or the like, to a transverse reinforcing rib 46 of the bracket 12, and has an integral projecting portion 45a arranged to extend into an aligning opening in the reinforcing rib 46. The rear or free end of the focusing shaft 42 extends rearwardly of this projecting portion 45a and the rib 46 and is preferably rounded so as to provide a smooth operating surface for engagement with the abutment surface 34.

A small screw 47 is threaded into the top of the housing 45 and is arranged to have a plain projecting lower end portion thereof extend into a slot or keyway 48 formed lengthwise in the outer surface of the bearing member 43 in such a manner that longitudinal sliding movement of the bearing member 43 in the cylindrical bore 44 is allowed, while, on the other hand, rotation of this bearing member will be ordinarily precluded. Thus, if the bearing member 43 is held (as by means presently to be described) against longitudinal movement even though the spring 39 may be exerting a forward pressure thereon and is also prevented from rotating, it will be clear that manual rotation of the handle 42' will effect a micrometer axial adjustment of the rounded rear end of shaft 42 and thus of abutment 32 and supporting shoe 18. Thus, manual adjustment of the objective 24 may be readily accomplished when desired.

Engaging a forward flanged portion 43' of the bearing member 43 is the upper bifurcated end of an actuating lever 50. This lever 50 is carried centrally on a cross shaft 52 pivotally supported or journalling in openings 53 in opposite side wall portions of the frame-like housing 45 and the lower end of the lever 50 is provided with a small roller 54 positioned so as to bear against a composite actuating cam 56. The cam 56 (see Figs. 4 and 5) is, in turn, carried by and arranged to rotate with a rotatable drive shaft 58 also journalled in a pair of openings in opposite side wall portions of the housing 45. Thus, the arrangement of the parts just described is such that while the lever 50 is maintained in a stationary position by engagement with the peripheral surface 56' of the cam 56, no longitudinal movement of the bearing member 43 due to the pressure of the spring 39 can take place. However, if the cam 56 is rotated to present different parts of the cam surface 56' to the roller 54, the bearing 43 will be shifted longitudinally slightly in the bore 44 and this will cause rearward shifting of the shoe 18 and the objective 24 in opposition to the pressure of the spring 39.

The drive shaft 58 (as shown in Fig. 5) also carries, besides the composite cam 56, a pair of control collars or discs 60 and 62 and a clutch mechanism 64 as well as a manually operable reset knob 66 thereon. As shown, parts 56, 60, 62 and 66 are secured in suitable fixed position upon the shaft 58 by setscrews or the like. The clutch mechanism 64 is a one-way clutch and likewise has a first part 68 which is secured by a set screw to the shaft 58, as well as a second part 70 which is arranged to function therewith and act as a driving member. The driving member 70, however, is rotatably journalled on the drive shaft 56 and confined between part 68 and cam 56 and has a worm gear 72 bolted or otherwise secured to a side thereof. Since the constructions of one-way clutches are well known, it is believed sufficient to point out here that the clutch mechanism of the present improved device employs a plurality of rollers (one of which is shown at 74) between the parts 68 and 70 so as to not only allow free rotation of the shaft 58 (and parts secured thereon) in a forward direction while parts 70 and 72 remain motionless but also functions when the driving part 70 rotates in the forward direction to effect a driving connection or coupling between the parts 68 and 70. This clutch arrangement, therefore, transmits power from the member 70 to the member 68 at certain times and, on the other hand, at other times allows part 68 and the shaft 58 to rotate forwardly relative to part 70.

The worm gear 72 has meshing engagement with a vertically disposed worm element 76 (see Fig. 3) which is coupled to an upwardly extending shaft of an electric motor 78. The worm element 67 has its upper end journalled in an inwardly projecting flange or web portion 80 of the housing 45. Thus, the motor 78 may be conveniently bolted or otherwise detachably secured to inwardly projecting flange portions 82 of the housing 45, and, accordingly, can easily be removed from the device when desired. The collars 60 and 62 are each angularly adjustable on shaft 58 and relative to the position of the camming surface on composite cam 56. As will be explained more fully hereinafter, they function separately and respectively to actuate first and second precision snap-action switches 84 and 86 once each during a 360° rotation of shaft 58 constituting an operating cycle of the focusing device.

The purpose of the mechanism thus far described is to care for the "drift" or changes in focus which have been found to occur in many, if not all, objectives of large motion-picture projectors, due primarily to the heat generated thereby during their normal operations. If, for example, the arc lamp of a projector is turned on and the objective immediately adjusted to "best focus" of the image being projected thereby onto its associated viewing screen, it will be noticed that during the first few minutes of operation of the projector, the objective may have to be manually readjusted several times in order to keep said image at its best focus. This readjustment of the objective is necessary during the "warming-up" period of the projector and its objective and it has been found that same may continue for as long as eight or ten minutes.

However, for a given projector and its objective, the warming-up period required for raising the temperature of the projector parts from normal room temperature to normal operating temperature will always be substantially the same. Accordingly, it is possible to shape the peripheral surface 56' of the cam means 56 with a "low point," and a "high point" and an intermediate controlled contour so as to provide a member which will actuate the lever 50 and axially shift the objective in a direction and at such a predetermined rate as to automatically compensate for the drift or change in focus which is inherent in the objective 24 at all moments during the warming-up period thereof.

As stated above, different objectives functioning in different projection equipment may have different warming-up and focusing characteristics and even though it may be difficult to determine exactly which parts of a particular projector or its objective are responsible for producing its changes or "drift" in focus, nevertheless, it is possible to readily and accurately determine the amounts of this drift, from the moment the cold projector is turned on until the time it reaches its stable operating condition; a period which may take from 2½ to 6, 8, or even 10 minutes. When such drift conditions for each particular projector or class of projectors have been determined, the particular cam shape required may be determined. Accordingly, in order to be able to use any one of many different cam shapes with the improved device of the present invention, cam 56 is made in the form of a composite cam. Composite cam 56, accordingly, is constructed and arranged in two parts, namely, a main disc-like part 89 (see Fig. 4) which is secured to the shaft 58 and a removable disc-like part or contoured shoe 90 which is bolted to the side of the main part. In order to allow the shoe 90 to be slipped over the shaft 58 and into its operative position or to be readily removed therefrom, it is provided with a radial slot 92. Thus, the contoured shoe 90 may have along its peripheral edge at points spaced from the slotted opening 92 a contour which is shaped so as to provide a maximum "throw" 94 as required for obtaining one extreme of focusing adjustment for the projector, as well as various lesser amounts of "throw" at points thereon nearer the slot 92. An uninterrupted functioning of the cam is insured by having the peripheral surface of the main part 89 of the cam adjacent slot 92 of a radius substantially identical to the radius of the cam surface of part 90 at locations adjacent slot 92. Thus, during one complete 360 degree cycle of operation of the composite cam mechanism 56, the roller 54 carried by the lower end of the lever 50 may be moved by the camming action from its position of minimum "throw" to its position of maximum "throw" and back to its position of minimum "throw" in an exact preselected manner, and this will depend directly upon the shape of the particular cam shoe 90 being employed. The removable cam shoe 90 may be secured to the main part 89 by bolts 99 or the like.

In Fig. 7, there is shown by a solid curved line 101 the amount of drift or change of focus in thousandths of a millimeter which one particular high speed projection objective in combination with its associated projector had over a period of approximately seven minutes before stabilizing, while the short dash line 102 shows the amount of drift or shift required during a five-minute warm-up period for a second high speed objective and projector combination. Also shown, by a dot-dash line 103, is a curve indicating the warm-up characteristics of a third objective and projector combination and the long dash line forming curve 104 indicates the warm-up characteristics of still another objective. The dotted line curve 105 shows still a different objective and projector combination. Each curve shows quite different warm-up characteristics. It may readily be concluded, therefore, from the chart of Fig. 7 that different projector and objective combinations of different physical and optical design may have appreciably different warm-up characteristics insofar as "best focus" is concerned, and even though this drift in focus is in thousandths of a millimeter and the time required is in minutes, nevertheless, this drift is critical and must be properly cared for. However, by proper shaping of the surfaces of a plurality of removable and interchangeable cam members such as indicated at 90, it is possible to provide a correct cam shape for each individual projector and objective combination.

The collars 60 and 62 (see Fig. 5) are provided with radially adjustable pins or buttons 60' and 62' respectively, and these buttons are arranged to operate, at preselected intervals in the operating cycle of the device, the snap-action switches 84 and 86, respectively. These switches, as well as motor 78, are indicated in the wiring diagram 106 of Fig. 6, for controlling the focus or drift compensating mechanism of the present invention.

In Fig. 6, the number 108 indicates the drive motor of a conventional motion-picture projector upon which the improved focusing device is to be employed. This motor 108 is arranged to receive electrical power from a 110 volt source of A. C. current and is controlled by a main control switch 112. Power for operating the drift compensating motor 78 is also taken from switch 112. Thus, when the switch 112 is closed, the film driving motor 108 will start to operate. (Note that the current for operating the arc lamp, not shown, of the projector will generally be separately controlled and will have been turned on previous to the starting of the film driving motor 108.)

While current will also be available at this time at terminals 114A and 114B on a connecting block 115, motor 78 will not operate. The reason for this is that while one main lead of motor 78 is connected to terminal 114A, the other main lead 118 of the motor 78 is connected to a conductor 122 extending between relay terminal 124a of normally closed control relay 124 and terminal 126a of a normally open relay 126, both of which relays are at this time de-energized. Since relay 126 is open, current from conductor 122 cannot pass therethrough and back to terminal 114B. On the other hand, while relay 124 is normally closed and will allow current to flow therethrough, it is nevertheless connected by lead 128 to a normally closed snap action reset switch 84 which is being, at this time, held open by the button 60' (see Fig. 5). Thus, motor 78 does not operate.

It is customary to provide on each commercial motion-picture projector a pivoted dowser for blocking out the projection beam at times when the film is not in motion and thus avoiding injury to the film. Such a pivoted dowser is indicated at 130 in Fig. 6 and same is arranged to be elevated during use of the projector by energizing a solenoid 132. Power (preferably a D. C. current) for the dowser solenoid is controlled by a second control switch 134 which is normally actuated by the projectionist as soon as a suitable marking or signal on the moving film in the projector has been reached. At this time, switch 134 would be closed and the dowser, accordingly, raised out of the path of the projection beam, indicated by the dotted circle 136.

Closing of switch 134, it will be seen from Fig. 6, will supply current directly to the coil of normally closed relay 124 causing same to open. At the same time, normally open relay 126 which is connected through normally closed snap-action switch 86 to the dowser current supply source will thus be energized and cause relay 126 to close. Accordingly, this closing of the dowser control switch 134 will energize and open relay 124 and simultaneously energize and close relay 126, with the result that A. C. current for motor 78 will flow from point 122 through relay 126 and back to terminal 114B.

Motor 78 will thus start to rotate cam 56 for compensatingly shifting the objective while the lenses, objective mount and other associated parts of the projector start to warm up.

The contour of the cam will, of course, be such as to just compensate for this drift in focus. The cam compensating effect will generally be greatest at first and then taper off, as indicated by the curves on Fig. 7. After a sufficient period of operation, approximately nine minutes in the present arrangement or three fourths of one complete revolution or cycle of twelve minutes of very slow rotation of the shaft 58 and cam 56, the stop button 62' on collar 62 will engage and open snap-action switch 86, and this will de-energize relay 126 and interrupt the flow of A. C. current through its relay points to motor 78. Thus, motor 78 will stop and cam 56 will hold the objective in its rearward position in opposition to the pressure from spring 39.

At this time, however, relay 124 will still be energized by the D. C. dowser supply current and will continue to interrupt the compensator motor current through its relay points. However, should the dowser switch 134 be opened, as at the end of the projection of a reel of film, relay 124 will be de-energized and will close. Since reset switch 84, in series therewith, is also closed, current will again flow to motor 78 and the shaft 58, cam 56, as well as collars 60 and 62 will be rotated to complete the remaining portion of the complete operating cycle. At such time, reset button 60' will engage snap-action switch 84 and open the circuit therethrough.

Since the complete operative cycle of such a device is preferably of considerable length and at times it may be desirable to reset the mechanism to its starting position without delay, the one-way clutch 64 is provided and allows the shaft 58 to be rotated forwardly even though the gear 72 in mesh with worm element 76 cannot be so rotated. The previously mentioned control knob 66 is secured to an outer free end of the shaft 58 for effecting forward rotation thereof when desired. Arranged to function with this control knob in bringing the drift compensating mechanism and controls back to their starting position is a spring-pressed ball detent 140 positioned in a hole in a wall of housing 45 and is arranged to seat in a spherical recess 142 in the back surface of control knob 66.

Having described my invention, I claim:

1. A film projector having an axially movable objective carried thereby and arranged to focus image-forming light rays upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam during said warm-up period, said cam means having a camming surface of such length and predetermined contour as to compensate for the expansion characteristics of said objective during said warm-up period, and means for initiating the operation of said compensating means at the time the projector starts to transmit said light rays through said objective, whereby substantially no appreciable change in focus in the image being projected onto said screen will occur during said warm-up period.

2. A film projector having an objective carried thereby, manually adjustable means for axially moving said objective to focus image-forming light rays transmitted thereby upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam means during said warm-up period, said cam means having a camming surface of such length and predetermined contour as to compensate for the expansion characteristics of said objective during said warm-up period, and means for initiating the operation of said compensating means at the time the projector starts to transmit said light rays through said objective, whereby substantially no appreciable change in focus in the image being projected onto said screen will occur during said warm-up period.

3. A film projector having an axially movable objective carried thereby and arranged to focus image-forming light rays upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam means during said warm-up period, spring means arranged to exert a pressure tending to move said objective axially in the opposite direction, said cam means having a camming surface of such length and predetermined contour as to compensate for the expansion characteristics of said objective during said warm-up period, and means for initiating the operation of said compensating means at the time the projector starts to transmit said light rays through said objective, whereby substantially no appreciable change in focus in the image being projected onto said screen will occur during said warm-up period.

4. A film projector having an axially movable objective carried thereby and arranged to focus image-forming light rays upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam means during said warm-up period, said cam means having a camming surface of such length and predetermined contour as to compensate for the expansion characteristics of said objective during said warm-up period, and means for initiating the operation of said compensating means at the time the projector starts to transmit said light rays through said objective, whereby substantially no appreciable change in focus in the image being projected onto said screen will occur during said warm-up period, means for rendering said motor inactive during continued operation of said projector, and means for energizing said motor for returning said cam means to its starting position when projection of said image-forming light rays is terminated.

5. A film projector having an axially movable objective carried thereby and arranged to focus image-forming light rays upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction, an electric motor for actuating said cam means during said warm-up period, said cam means having a camming surface of such length and predetermined contour as to compensate for the expansion characteristics of said objective during said warm-up period, a movable dowser arranged to intercept said light rays before said rays pass through said objective, electrical means for moving said dowser into a retracted position out of the path of said light rays, and means for simultaneously initiating the operation of said electrical means and said electric motor for moving said dowser to its retracted position and for actuating said cam means resspectively, whereby substantially no appreciable change in focus in the image being projected onto said screen will occur during said warm-up period.

6. A film projector having an objective carried thereby, manually adjustable means for axially moving said objective to focus image-forming light rays transmitted thereby upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam means during said warm-up period, said cam means having a camming surface of such length and predetermined contour as to compensate for the expansion characteristics of said objective during said warm-up period, a movable dowser arranged to intercept said light rays before said rays pass through said objective, electrical means for moving said dowser into a retracted position out of the path of said light rays, and means for simultaneously initiating the operation of said electrical means and said electric motor for moving said dowser to its retracted position and for actuating said cam means respectively, whereby substantially no appreciable change in focus in the image being projected onto said screen will occur during said warm-up period.

7. A film projector having an axially movable objective carried thereby and arranged to focus image-forming light rays upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam means during said warm-up period, spring means arranged to exert a pressure tending to move said objective axially in the opposite direction, said cam means having a camming surface of such length and predetermined contour as to compensate for the expansion characteristics of said objective during said warm-up period, a movable dowser arranged to intercept said light rays before said rays pass through said objective, electrical means for moving said dowser into a retracted position out of the path of said light rays, and means for simultaneously initiating the operation of said electrical means and said electric motor for moving said dowser to its retracted position and for actuating said cam means respectively, whereby substantially no appreciable change in focus in the image being projected onto said screen will occur during said warm-up period.

8. A film projector having an axially movable objective carried thereby and arranged to focus image-forming light rays upon an associated viewing screen, said objective possessing expansion characteristics which change as the temperature of the objective changes during each warm-up period of said projector and tend to cause a change in focus of the image being projected thereby, compensating means carried by said projector and operatively connected to said objective for continuously maintaining said image in focus during said warm-up period, said compensating means comprising cam means for axially moving said objective in a predetermined direction and an electric motor for actuating said cam means during said warm-up period, said cam means having a camming surface of such length and predetermined contour as to compensate for the expansion characteristics of said objective during said warm-up period, a movable dowser arranged to intercept said light rays before said rays pass through said objective, electrical means for moving said dowser into a retracted position out of the path of said light rays, means for simultaneously initiating the operation of said electrical means and said electric motor for moving said dowser to its retracted position and for actuating said cam means respectively, whereby substantially no appreciable change in focus in the image being projected onto said screen will occur during said warm-up period, means for rendering said motor inactive during continued operation of said projector, and control means for energizing said motor for returning said cam means to its starting position when projection of said image-forming light rays is terminated.

References Cited in the file of this patent

UNITED STATES PATENTS

| | | |
|---|---|---|
| 771,828 | Mead et al. | Oct. 11, 1904 |
| 2,054,268 | Owens | Sept. 15, 1936 |
| 2,469,009 | Simmon | May 3, 1949 |
| 2,533,478 | Lee et al. | Dec. 12, 1950 |
| 2,723,591 | Taylor | Nov. 15, 1955 |